United States Patent
Elston et al.

(10) Patent No.: US 9,785,526 B2
(45) Date of Patent: Oct. 10, 2017

(54) AUTOMATED GENERATION OF A TEST CLASS PRE-HEADER FROM AN INTERACTIVE GRAPHICAL USER INTERFACE

(71) Applicant: Advantest Corporation, Tokyo (JP)

(72) Inventors: Mark Elston, Salinas, CA (US); Ankan Pramanick, San Jose, CA (US); Leon Chen, San Jose, CA (US); Chandra Pinjala, San Jose, CA (US)

(73) Assignee: ADVANTEST CORPORATION, Tokyo (JP)

( * ) Notice: Subject to any disclaimer, the term of this patent is extended or adjusted under 35 U.S.C. 154(b) by 1153 days.

(21) Appl. No.: 13/874,380

(22) Filed: Apr. 30, 2013

(65) Prior Publication Data
US 2014/0324378 A1    Oct. 30, 2014

(51) Int. Cl.
*G06F 19/00* (2011.01)
*G06F 11/263* (2006.01)

(52) U.S. Cl.
CPC ................. *G06F 11/263* (2013.01)

(58) Field of Classification Search
USPC ................. 702/108, 119; 717/104
See application file for complete search history.

(56) References Cited

U.S. PATENT DOCUMENTS

| | | | |
|---|---|---|---|
| 5,313,387 A | 5/1994 | McKeeman et al. | |
| 5,675,803 A | 10/1997 | Preisler et al. | |
| 6,106,571 A | 8/2000 | Maxwell | |
| 6,836,884 B1 | 12/2004 | Evans et al. | |
| 7,197,417 B2 * | 3/2007 | Pramanick | G01R 31/3183 702/108 |
| 7,353,427 B2 | 4/2008 | Bates et al. | |
| 7,363,617 B2 | 4/2008 | Barsness et al. | |
| 7,367,015 B2 | 4/2008 | Evans et al. | |
| 7,516,441 B2 | 4/2009 | Hamilton et al. | |
| 8,010,839 B2 | 8/2011 | Shimura | |

(Continued)

OTHER PUBLICATIONS

Pramanick et al., Test Programming Environment in a Modular, Open Architecture Test System, in proceeding of: Test Conference, 2004, p. 413-422, IEEE Computer Society, Washington, DC.

(Continued)

*Primary Examiner* — Lam Nguyen

(57) ABSTRACT

A method for performing tests using automated test equipment (ATE) is presented. The method comprises obtaining information concerning a test class using a graphical user interface. Further, it comprises generating a first header file automatically, wherein the first header file comprises the information concerning the test class. Next, it comprises importing the first header file into a test plan operable to execute using a tester operating system wherein the test plan comprises instances of the test class. It further comprises, generating a second header file from the first header file automatically, wherein the second header file is a header file for the test class. The method also comprises validating the test plan using the tester operating system. Finally, the method comprises loading the test plan and a compiled module onto the tester operating system for execution, wherein the compiled module is a compiled translation of the test class.

19 Claims, 9 Drawing Sheets

(56) References Cited

U.S. PATENT DOCUMENTS

| | | | |
|---|---|---|---|
| 8,782,599 B2 * | 7/2014 | Eldridge | G06F 8/34 717/104 |
| 2005/0039079 A1 | 2/2005 | Higashi et al. | |
| 2005/0120274 A1 | 6/2005 | Haghighat et al. | |
| 2005/0154550 A1 | 7/2005 | Singh et al. | |
| 2008/0126865 A1 | 5/2008 | Lee | |
| 2008/0262778 A1 | 10/2008 | Katagiri et al. | |
| 2008/0295114 A1 | 11/2008 | Argade et al. | |
| 2009/0204849 A1 | 8/2009 | Shimura | |
| 2009/0316311 A1 | 12/2009 | Hara et al. | |
| 2009/0327942 A1 | 12/2009 | Eldridge et al. | |
| 2010/0023294 A1 | 1/2010 | Fan et al. | |
| 2013/0019228 A1 | 1/2013 | Bates | |

OTHER PUBLICATIONS

MSDN, Edit and Continue, 2005, Retrieved from http://msdn.microsoft.com/en-us/library/bcew296(v=vs.80)aspx.

* cited by examiner

```
...

TestCondition TC1
{
    TestConditionGroup = TCG1; # Previously defined TCG for Levels
    Selector = min;
}

TestCondition TC2
{
    TestConditionGroup = TCG2; # Previously defined TCG for Timing
    Selector = max;
}

...

Test MyFunctionalTest FuncTest1
{
    PListParam = patList1; # Previously defined pattern list
    TestConditionParam = TC1;
    TestConditionParam = TC2;
}

...
```

FIG. 4

AUTOMATED GENERATION OF A TEST CLASS PRE-HEADER FROM AN INTERACTIVE GRAPHICAL USER INTERFACE

FIELD OF THE INVENTION

Embodiments of the present invention relate generally to automated device testing and more specifically to a user-friendly and automated method of creating test plans and test classes for automated device testing.

BACKGROUND OF THE INVENTION

Automated test equipment (ATE) can be any testing assembly that performs a test on a device, semiconductor wafer or die, etc. ATE assemblies may be used to execute automated tests that quickly perform measurements and generate test results that can then be analyzed. An ATE assembly may be anything from a computer system coupled to a meter, to a complicated automated test assembly that may include a custom, dedicated computer control system and many different test instruments that are capable of automatically testing electronics parts and/or semiconductor. Automatic Test Equipment (ATE) is commonly used within the field of electrical chip manufacturing. ATE systems both reduce the amount of time spent on testing devices to ensure that the device functions as designed and serve as a diagnostic tool to determine the presence of faulty components within a given device before it reaches the consumer.

In testing devices or products, e.g. after production, it is crucial to achieve among others a high product quality, an estimation of the device or product performance, a feedback concerning the manufacturing process and finally a high customer contentment. Usually a plurality of tests is performed in order to ensure the correct function of a device or product, commonly referred to as a device under test ("DUT") in testing parlance. The plurality of tests is typically part of a test plan that is loaded into the ATE system by the user. The test plan acts as a blueprint for running the tests on the DUTs. The plurality of tests may be compiled in a test flow wherein the test flow may be separated into different test groups which contain one or more tests for testing the device or product. For example, a semiconductor device may be tested with a test flow comprising contact tests, current-voltage tests, logic tests, speed tests, stress tests and functional tests.

In a typical ATE system, users can develop test classes for a given test plan by using an application programming interface. When the test plan is loaded, the ATE system controller conducts a validation analysis of the test classes to determine if all the nodes in the test flow can be appropriately configured according to the user's expectations. In order to validate the test plan, the ATE system controller needs a pre-header file for the test classes. The pre-header files for the respective test classes, among other things, describe the test class and its various parameters to the ATE system controller in order to perform the validation. The pre-header file is also used to generate a C++ header file for the test class itself, which provides a common definitional bridge between the test class developed by the user and the test plan developed by the test plan author.

In conventional ATE systems, creating the pre-header file is cumbersome because the user typically has to develop the program code for the pre-header file manually, which is exceedingly time consuming because the user has to learn the special format or syntax required for the pre-header file. Further, the process is error prone, as the code syntax is not user-friendly, but rather at a low machine level.

BRIEF SUMMARY OF THE INVENTION

Accordingly, what is needed is an ATE system that provides users with a graphical user interface (GUI) to enable the users to define the parameters of their test classes with simple drag and drop procedures for interfacing with the GUI, thereby, facilitating the automated development of the pre-header file.

In one embodiment, a method for performing tests using automated test equipment (ATE) is presented. The method comprises obtaining information concerning at least one test class using a graphical user interface. Further, it comprises generating a first header file automatically, wherein contents of the first header file comprise the information concerning at least one test class. Next, the method comprises importing the first header file into a test plan operable to execute using a tester operating system wherein the test plan comprises instances of the at least one test class. It also comprises generating a second header file from the first header file automatically, wherein the second header file is a header file for the at least one test class, and wherein the second header file and the at least one test class are prepared using a common programming language. The method also comprises validating the test plan using the tester operating system. Finally, the method comprises loading the test plan and at least one compiled module onto the tester operating system for execution, wherein each of the at least one compiled module is a compiled translation of a respective one of the at least one test class, and wherein the second header file is used to generate the at least one compiled module.

In another embodiment, a computer-readable storage medium having stored thereon, computer executable instructions that, if executed by a computer system cause the computer system to perform a method for performing tests using automated test equipment (ATE) is disclosed. The method comprises obtaining information concerning at least one test class using a graphical user interface. Further, it comprises generating a first header file automatically, wherein contents of the first header file comprise the information concerning at least one test class. Next, the method comprises importing the first header file into a test plan operable to execute using a tester operating system wherein the test plan comprises instances of the at least one test class. It also comprises generating a second header file from the first header file automatically, wherein the second header file is a header file for the at least one test class, and wherein the second header file and the at least one test class are prepared using a common programming language. The method also comprises validating the test plan using the tester operating system. Finally, the method comprises loading the test plan and at least one compiled module onto the tester operating system for execution, wherein each of the at least one compiled module is a compiled translation of a respective one of the at least one test class, and wherein the second header file is used to generate the at least one compiled module.

In one embodiment, a system for performing an automated test is presented. The system comprises a memory comprising a tester operating system stored therein. It also comprises a communicative interface operable to connect to a plurality of devices under test (DUTs). Further, the system comprises a processor coupled to the memory and the communicative interface. The processor is configured to operate in accordance with the tester operating system to (a) obtain information concerning at least one test class using a graphical user interface; (b) generate a first header file automatically, wherein contents of the first header file comprise the information; (c) import the first header file into a test plan operable to execute using the tester operating system, wherein the test plan comprises instances of the at least one test class, and wherein the test plan is operable to define tests to be run on the plurality of DUTs; (d) generate a second header file from the first header file automatically, wherein the second header file is a header file for the at least one test class, and wherein the second header file and the at least one test class are prepared using a common programming language; (e) validate the test plan using the tester operating system; and (f) load the test plan and at least one compiled module onto the tester operating system for execution, wherein each of the at least one compiled module is a compiled translation of a respective one of the at least one test class and wherein the second header file is used to generate the at least one compiled module.

In one embodiment, a method for performing tests using automated test equipment (ATE) is disclosed. The method comprises obtaining information concerning at least one test class using a graphical user interface. The method also comprises generating a header file automatically, wherein contents of the first header file comprise the information. The graphical user interface comprises a display editor window and a text editor window, wherein changes made in the display editor window are automatically mapped to corresponding changes in the text editor window, and further wherein changes made in the text editor window are automatically mapped to corresponding changes in the display editor window.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 4 illustrates an example of a test class instantiation in a test plan.

DETAILED DESCRIPTION OF THE INVENTION

Figure 1:
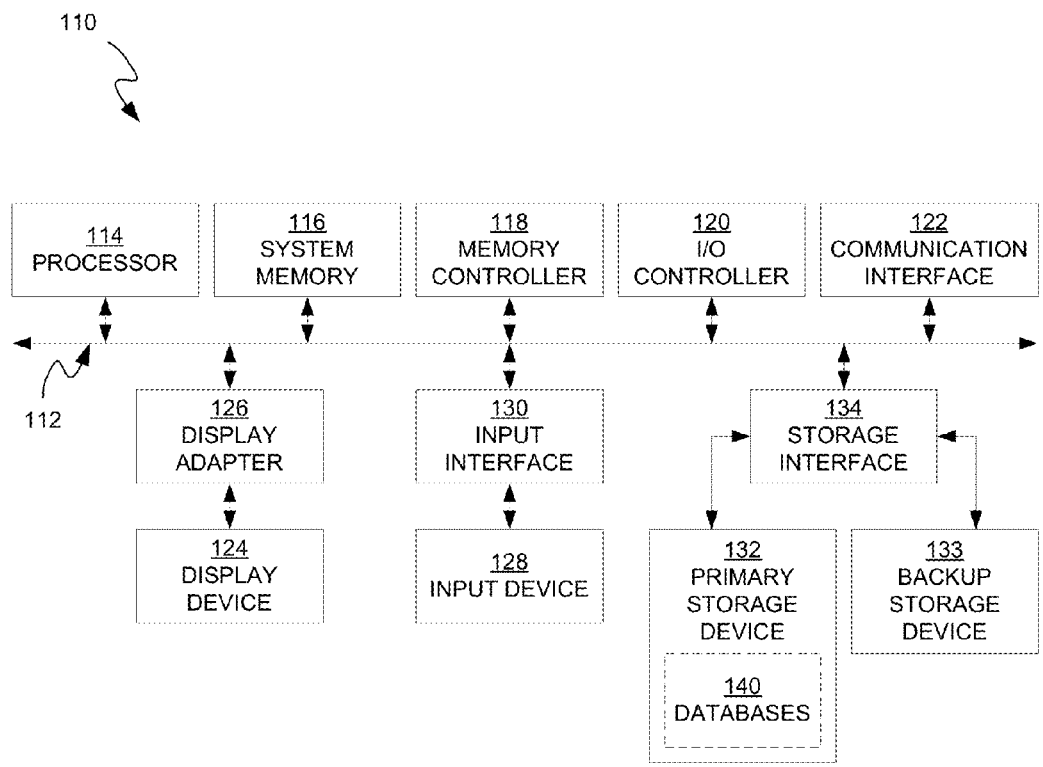
FIG. 1 is a computer system on which embodiments of the automated test system of the present invention can be implemented in accordance with one embodiment of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "importing," "validating," "loading," "instantiating," "executing," "identifying," "allocating," "associating," "accessing," "determining," "identifying" or the like, refer to actions and processes (e.g., flowchart 900 of FIG. 9) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of implementing embodiments of the present disclosure. For example, computing system 110, in one embodiment, could implement the controller of the tester system, wherein the graphical user interface used to generate pre-header files runs on the controller. Computing system 110 broadly represents any single or multi-processor computing device or system capable of executing computer-readable instructions. Examples of computing system 110 include, without limitation, workstations, laptops, client-side terminals, servers, distributed computing systems, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

For example, a computer program for running test plans may be stored on the computer-readable medium and then stored in system memory 116 and/or various portions of storage devices 132 and 133. When executed by the processor 114, the computer program may cause the processor 114 to perform and/or be a means for performing the functions required for sharing resources between multiple test cores in a concurrent test environment.

Automated Generation of a Test Class Pre-Header from an Interactive Graphical User Interface Conventional methods of creating a pre-header file involved writing the code manually, which was problematic for various reasons. First, in order to prepare the pre-header file, the user needed to have a functional knowledge of the appropriate syntax for defining the pre-header. Second, because the process was manual, it was error prone. Embodiments of the present invention address these issues by providing a graphical user interface (GUI) that allows users to define the parameters of their tests using user-friendly drag and drop procedures within a GUI, thereby, facilitating the development of the pre-header file.

Figure 2A:
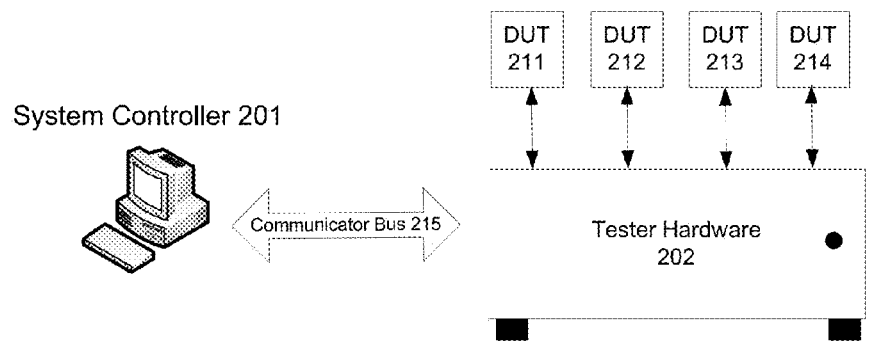
FIG. 2A is a schematic block diagram for an automated test equipment apparatus on which embodiments of the present invention can be implemented in accordance with one embodiment of the present invention.

FIG. 2A is a schematic block diagram for an automated test equipment (ATE) apparatus on which embodiments of the concurrent test system can be implemented in accordance with one embodiment of the present invention. In one embodiment, the system controller 201 comprises one or more linked computers. For example, testing systems such as Advantest Corporation's T2000 tester family, can use a network of computers. In other embodiments, the system controller often comprises only a single computer. The system controller 201 is the overall system control unit, and runs the software for the ATE that is responsible for accomplishing all the user-level testing tasks, including running the user's main test plan. One example of such tester software is the T2000 System Software ("TSS"). Typically, tester software such as TSS comprises a compiler, which compiles test plans written in the programming language of the tester system, e.g. OPENSTAR Test Programming Language ("OTPL").

The communicator bus 215 provides a high-speed electronic communication channel between the system controller and the tester hardware. The communicator bus can also be referred to as a backplane, a module connection enabler, or system bus. Physically, communicator bus 215 is a fast, high-bandwidth duplex connection bus that can be electrical, optical, etc. In one embodiment, communicator bus 215 can use the TCP/IP protocol. System controller 201 sets up the conditions for testing the DUTs 211-214 by programming the tester hardware through commands sent over the communicator bus 215.

Tester hardware 202 comprises the complex set of electronic and electrical parts and connectors necessary to provide the test stimulus to the devices under test (DUTs)

211-214 and measure the response of the DUTs to the stimulus, and compare it against the expected response. In one embodiment, tester hardware 202 can comprise multiple site controllers, wherein each site controller is connected to multiple DUTs. Each site controller is a computer used in a device test. A test plan program can be executed on a site controller. The site controllers are connected to the system controller and test operations performed by a user are processed on the system controller, which controls the site controllers over communicator bus 215.

Figure 2B:
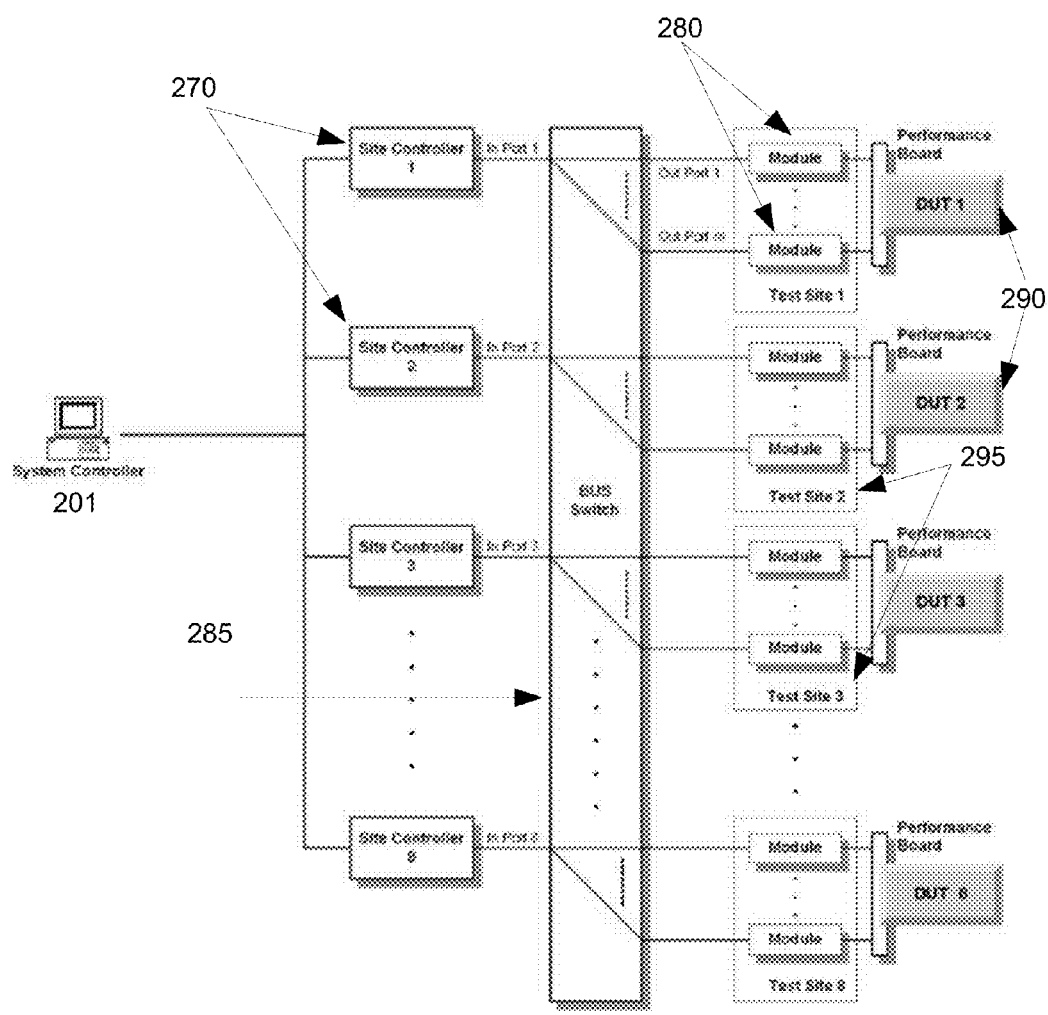
FIG. 2B is a more detailed schematic block diagram of one embodiment of the automated test equipment apparatus of FIG. 2A.

FIG. 2B is a more detailed schematic block diagram of one embodiment of the automated test equipment apparatus of FIG. 2A. In the embodiment illustrated in FIG. 2B, tester hardware 202 can comprise multiple site controllers 270, wherein each site controller is connected to multiple DUTs. Each site controller is a computer used in a device test. A test plan program can be executed on a site controller, which controls test modules 280 in the course of performing device tests for DUTs 290. The site controllers 270 are connected to the system controller, which controls the site controllers over communicator bus 215. In some embodiments, test developers cannot directly operate the site controllers but instead operations performed by the developer are processed on the system controller 201, which controls the site controllers via communicator bus 215.

Site controllers 270 and test modules 280, in one embodiment, can be connected via high-speed optical buses. The bus switch 285 has a matrix structure for connecting the site controllers with the test modules. Using the bus switch 285 allows a site controller to connect with any test modules 280, and allows flexibility in configuring bus connections.

Test modules 280 required for device test are typically mounted in the test system test head. Test module configuration can be adapted to the targeted device. A set of test modules 280 required for device test is called a test site. Each test site 295 is controlled by a site controller. There can be various types of test modules for many applications. Some exemplary types of modules are sync-generator module, sync-matrix module, device power supply module, analog module, RF module and digital module.

As is well-known, a test plan or test program comprises all user-defined data and control flows that are necessary to perform a semiconductor device test on an ATE system. More specifically, a test plan is a program where test conditions which satisfy device specifications, combinations of test conditions and test algorithms, and a test flow are described in the language of the tester software, e.g., OTPL. The test plan typically runs on a site controller. The main control flow in a test program, which dictates the sequence of individual tests to be applied to the DUTs, and the order in which the tests will be applied (which is dependent on the results of individual tests), is referred to as the test program flow.

When a test program is written for a DUT, in general a predominant part of the program is "data" for device test, and the rest is the program code, which realizes the test methodology itself. The data is DUT-dependent (e.g., power supply conditions, signal voltage conditions, timing conditions, etc.). The test code may consist of methods to load the specified device conditions on to tester hardware, and also those needed to realize the user specified objectives such as data-logging, etc. The ATE framework can also provide a hardware-independent test and tester object model that allows the user to perform the task of DUT test programming.

Since test methodology is a significant component in device test quality and tester productivity, it is often encapsulated from the end users. This separation results in safer operation of the system. Further, to increase the reusability of test code, such code should be independent of any device-specific data, e.g., pin name, stimulus data, etc. or device-test-specific data, e.g., conditions for DC units, measurement pins, number of target pins, name of pattern file, addresses of pattern programs, etc. If code for a test is compiled with data of these types, the reusability of the test code would decrease. Therefore, any device-specific data or device-test-specific data should be made available to the test code externally as inputs during code execution time.

In conventional ATE tester software, a "test class," realizes the separation of test data and code (and, hence, the reusability of code) for a particular type of test. Such a test class could be regarded as a "template" for separate instances of a test, which differ from each other only on the basis of device-specific and/or device-test-specific data. Test classes are typically specified in the test plan file. Each test class typically implements a specific type of device test or setup for device test. For example, the tester software can provide sample test classes to implement functional tests, AC parametric tests, and DC parametric tests. Accordingly, a test class is the template for a test. Device-dependent test conditions are not described in the test class itself. Only an algorithm for executing tests using the test system is described.

Test classes allow the user to configure class behavior by providing parameters that are used to specify the options for a particular instance of that test. For example, a test class for implementing a functional test may provide parameters to specify a test pattern to execute on the DUTs being tested. Also it may provide parameters to specify the level and timing conditions for the test. Specifying different values for these parameters allows the user to create different instances of the functional test. In one embodiment, test classes are developed in a conventional programming language such as C++.

In a tester software system such as TSS, a test plan can be described in a test programming language such as OTPL, as discussed above. OTPL can be used to describe test execution sequence and the corresponding test conditions used. While OTPL can describe a test plan, it typically does not describe any test algorithm. The test algorithm in a system such as TSS, for example, can be described using the C++ language in a test class as discussed above.

While the following discussion of the invention is in the context of the TSS tester software, wherein test plans are developed using OTPL and test classes are developed using C++, the present invention is not limited to this embodiment. Other types of tester software using different programming languages may be employed in other embodiments. It will be understood to one of ordinary skill in the art that the teachings of the present invention can cover alternatives, modifications and equivalents, which may be included within the spirit and scope of the disclosure as defined by the appended claims.

Figure 3:
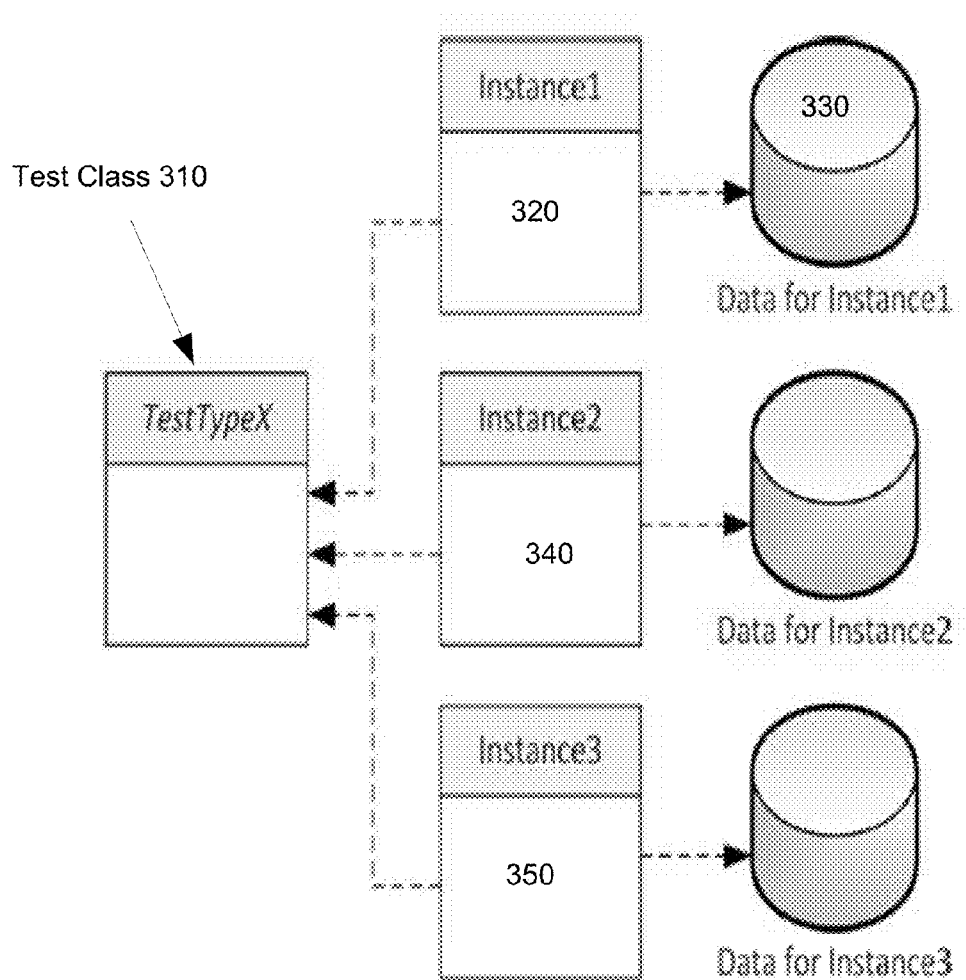
FIG. 3 illustrates a diagram regarding the manner in which different test instances can be created from a single test class.

FIG. 3 illustrates a diagram regarding the manner in which different test instances can be created from a single test class. In the example from FIG. 3, test class 310 can be used to create three separate instances of the test "TestTypeX." Each of the three instances, Instance1 320, Instance2 340, and Instance3 350, receives a separate set of parameter data for each instance of the test. For example, Instance1 320 receives parameter data 330, while the remaining instances receive their own set of parameters.

In conventional tester systems, the tester system software can provide a mechanism for verifying that the appropriate parameters are available for inclusion in the generated source code. The tester system software provides a method that allows the test class developer to fully specify, in a text-based source file per test class, the public methods and attributes of the test class that the developer has designated are the ones required to parameterize the class. Specifying its methods and attributes in a text file allows the tester software to easily determine if the appropriate parameters are available, which facilitates the error checking and validation of the test plan during the translation phase. In conventional ATE systems, this text-based description is embedded in a pre-header file for the test class, which is used by the compiler in the tester software to determine the methods and attributes of the test class. Further, it is used by the compiler for generating the header for the test class. In one embodiment, the header for the test class, similar to the test class itself, may also be in a conventional programming language such as C++. The generated C++ header file is the one used to finally compile the test class C++ code. Meanwhile, the pre-header file may be developed in the same language as the programming language of the tester system, e.g. OTPL or in a sub-language of the programming language of the tester system, e.g., a sub-language of OTPL.

FIG. 4 illustrates an example of a test class instantiation in a test plan. Consider the excerpt in FIG. 4 from an exemplary OTPL source file, with a test instance "FuncTest1." The OTPL processor of system controller 201 needs to know what the "MyFunctionalTest" test class entails in order to determine whether the declaration of FuncTest1 in FIG. 4 is legal. Rather than building in the knowledge of a "MyFunctionalTest" into the language, the definition of what a "MyFunctionalTest" class entails can be specified in the pre-header sub-language of OTPL within a pre-header file.

As shown in FIG. 4, "MyFunctionalTest" is a C++ class having members comprising a "PListParam" and a "TestConditionParam." The OTPL compiler needs to know about the members of "MyFunctionalTest" in order to recognize that the declaration of "FuncTest1" in FIG. 4 is legal. Further, in order to generate a C++ object declaration for "FuncTest1," a C++ header for the class "MyFunctionalTest" needs to be constructed. This requires the OTPL compiler to also know about any base classes of the "MyFunctionalTest" class, the names of its members and other such information.

The pre-header file and the pre-header sub-language provide the OTPL compiler with the information it needs to both recognize the legality of OTPL declarations, and to generate C++ headers and object declarations that correspond to an OTPL declaration. Further, the pre-header and the pre-header sub-language of OTPL allow for the generation of C++ header files for test classes. Also, the parameters shown in the code of FIG. 4, e.g., min, max, and patList1 etc., are validated against the set of parameters specified for the respective test class in its pre-header file.

Figure 5:
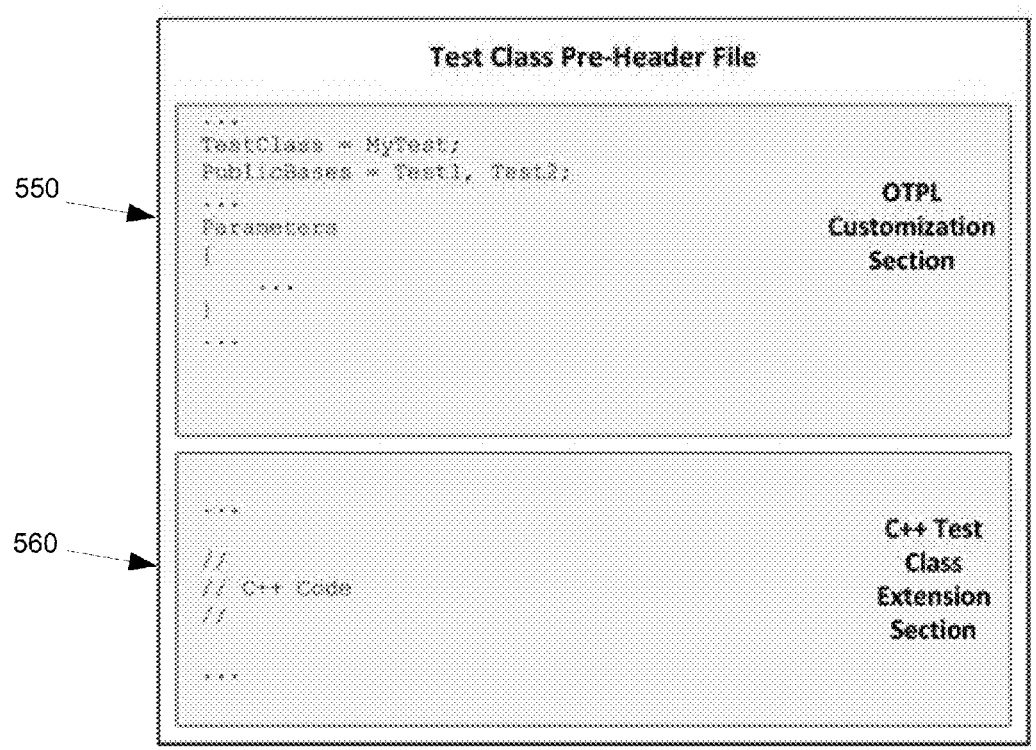
FIG. 5 illustrates the basic structure of a pre-header file.

FIG. 5 illustrates the basic structure of a pre-header file using an OTPL pre-header file as an example. The pre-header file comprises two main sections. The first section 550 can comprise OTPL customizations for the test class, which includes specifications such as the name of the test class, its C++ DLL name (if necessary), options for supporting various automatic code generation features, and the test class parameters definition section.

The pre-header file, as discussed above, is used to create a C++ header file for compiling the C++ code generated by the OTPL compiler into an executable test class. Therefore, in order to get the desired functionality, test class extension code written in C++ may be required. The second section 560 in the pre-header file is for test-class-specific test class extension code in C++ to support extending the test class C++ code beyond what is automatically generated as a result of the specifications in the previous (i.e. OTPL customization) section. It should be noted that this section may not be necessary since the OTPL compiler could possibly create a valid C++ test class header from the first section alone.

Three types of files are typically created during test class development in the ATE system of FIG. 5. The first is a C++ source file. Test class functions such as member functions are implemented in a C++ source file. The test class developer typically creates the C++ source file according to a test algorithm.

The second type of file created is a C++ header file. The test class is typically declared with its member data and member functions in a C++ header file. Data member names and member function names in a test class are typically defined in a C++ header file. The test class header file, as discussed above, is typically generated from the OTPL pre-header file, the example structure of which is illustrated in FIG. 5. The test class developer, therefore, does not create the header file, it is generated automatically by the OTPL compiler from the test class pre-header file.

The third type of file is an OTPL pre-header file. An OTPL pre-header file is imported into an OTPL test plan file. Typically, the test class developer creates the pre-header file first. Test class parameter definitions are also usually described in the pre-header file. In conventional systems a test class pre-header file was typically created from scratch requiring the user to be familiar with the syntax for creating the file and also to write the code manually.

In one embodiment, there is also a natural order to the three types of files created. The pre-header file is created first as it is used to generate the C++ header file, which is generated next. Finally, the C++ header file is consumed by the source code within the C++ source file during compilation and a test class DLL is created.

Embodiments of the present invention addresses this problem by providing a test class developer with a test class pre-header editor which comprises a graphical user interface that can be used to define the pre-header file by interacting with the GUI using drag, drop and other interactive operations. In one embodiment, this pre-header editor can be provided to the user as a plug-in for a commercial integrated development environment (IDE) such as Microsoft Visual Studio, for instance. The pre-header editor assists test class developers with the task of creating a test class pre-header file, and advantageously makes the process easier, faster and less error-prone.

In one embodiment, the pre-header editor obtains the basic information regarding a test class from the test class developer through a graphical user interface and creates the pre-header. This relieves the developer of the burden of remembering the syntax, types and properties of test class parameters.

Further, in one embodiment, the pre-header editor may provide two different views of a pre-header to assist with the task of editing it. First, a design view may be provided, which is a GUI allowing users access to all the elements of a pre-header file, so that the user simply has to fill in the value for such elements.

Second, a code view may be provided, which is a simple, direct textual representation of the pre-header file that allows the user to directly edit the text of the pre-header.

Figure 6:
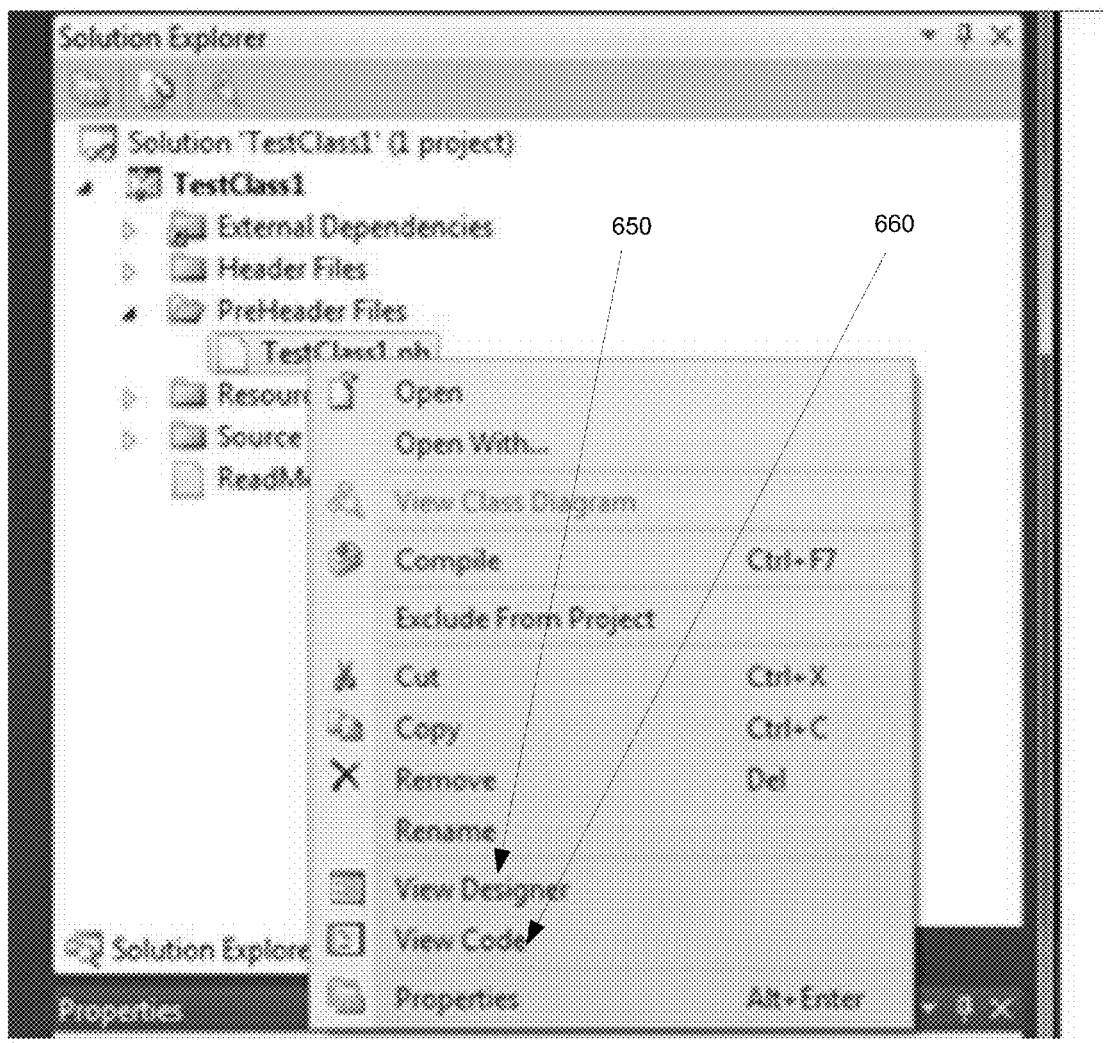
FIG. 6 illustrates the GUI to switch between code view and design view in accordance with one embodiment of the present invention.

In one embodiment, the user is free to work with whichever view is preferred, and switch between them when desired. The pre-header editor manages the synchronization of the views, leaving the user free to concentrate on the task of coding. FIG. 6 illustrates the GUI provided interface to switch between code view and design view in accordance with one embodiment of the present invention. Once the pre-header file has been loaded into the IDE, the user can easily choose from between two context menu items in a drop down menu, allowing the user to switch easily between design view 650 and code view 660.

In one embodiment, the editor creates the pre-header files in the same environment as the test class development since the editor is a plug-in to the same IDE as the one used to develop the test class.

In another embodiment, the GUI of the design editor allows the user to select or enter values for various attributes that are used to generate the pre-header file. As mentioned above, when the user makes a change in the design editor, the textual pre-header file is automatically updated with the changes. However, when saving the changes made to the pre-header file in design view, the edited version is checked for syntax and semantic errors. If there are any errors, the test class header file will not be generated.

In the code view of the pre-header editor, the pre-header file contents are shown in a text editor within the IDE. When saving the pre-header file after making changes, the pre-header file is checked for syntax and semantic errors, and such errors, if any, are displayed through the usual IDE error logging mechanism. If there are errors while in code view, the edits do not prevent the user from saving the file, however, the design view will no longer be operational for a pre-header with syntax errors in it. The pre-header editor will automatically generate the test class C++ header file whenever the code editor information is saved without any errors.

Further, in one embodiment, the editor can automatically generate the test class declaration C++ header file from the pre-header file directly. When the pre-header file is saved from either within the code view or the design view, the test class C++ header file is automatically generated if there are no syntax and semantic errors. The C++ header file provides a common definitional bridge between the test class developed by the user and the test plan developed by the test plan author.

Figure 7:
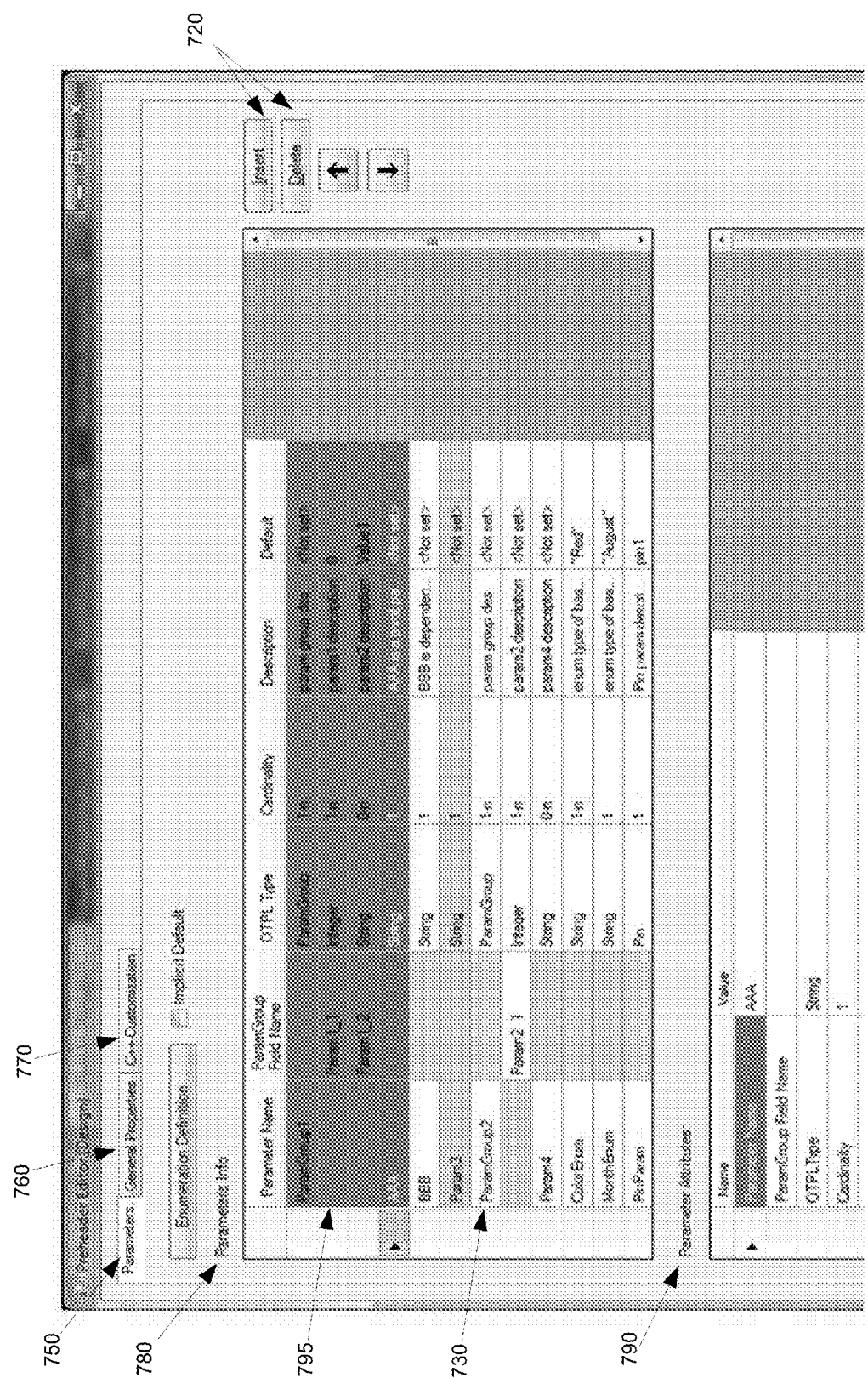
FIG. 7 illustrates an exemplary design view mode for the pre-header editor in accordance with one embodiment of the present invention.

FIG. 7 illustrates an exemplary design view mode for the pre-header editor in accordance with one embodiment of the present invention. The fields in the editor can be grouped into three categories with each category displayed in a separate tab. As illustrated in FIG. 7, the first category 750 may be for entering parameters comprising fields to specify the test class parameters. The second category 760 may be for general properties comprising fields to specify general information about the test class, e.g., test class name, base test class names, etc. The last category 770 may be for C++ customization, comprising fields to specify the test class extension code.

Within the parameters category, as displayed in FIG. 7, there are two grid controls to display parameter information. Parameters Info 780 may contain information for all parameters. Parameter Attributes 790 may contain more specific information corresponding to the parameter that is selected in the Parameters Info 780 grid. In one embodiment, each parameter within the editor is predefined with default values that the user may be allowed to change.

The Parameters Info 780 grid may also show parameters 795 that are inherited from the other base test class pre-headers. Parameters 795, while shown, are dimmed out and cannot be edited. However, by showing parameters 795, it allows the user to visually review parameters inherited from other base test classes, thereby, preventing the user from picking any conflicting duplicate parameters names. Thus, the GUI makes the process of creating the pre-header file less error prone.

In one embodiment, the parameters category 750 may also include "Insert" and "Delete" buttons 720 for adding or deleting parameters easily.

In one embodiment, the GUI of the editor will also allow the user to define attributes of a parameter group, e.g., parameter group 730 in FIG. 7. A parameter group acts like a data structure that allows the user to treat a group of individual parameters as a single entity.

The design view of the graphical user interface therefore provides a template to a user to input parameter information that can then be used to automatically generate the pre-header code.

Figure 8:
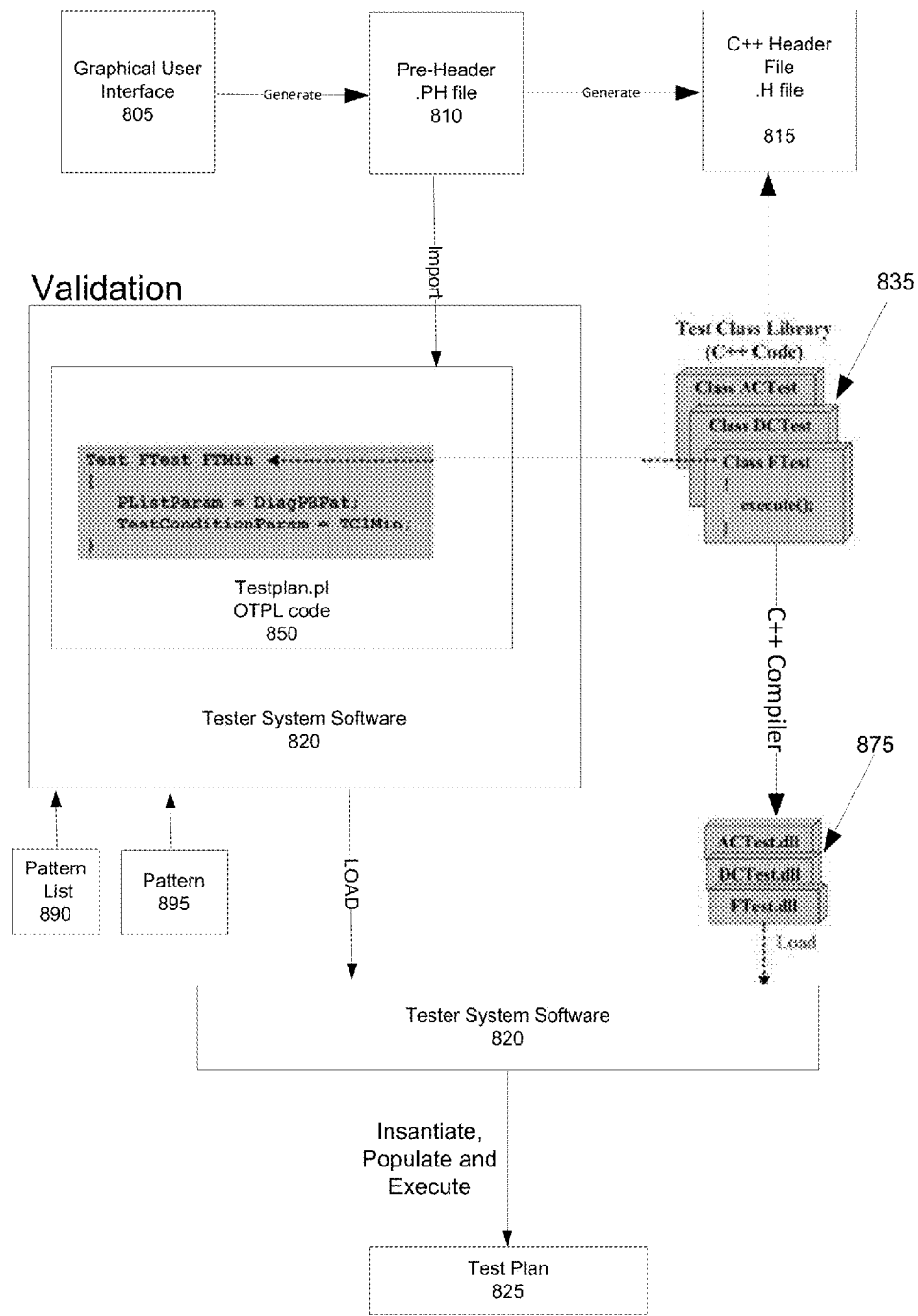
FIG. 8 is a schematic block diagram of an exemplary software process illustrating the generation and function of the pre-header file using a graphical user interface for the automated test system in accordance with one embodiment of the present invention.

FIG. 8 is a schematic block diagram of an exemplary software process illustrating the generation and function of the pre-header file using a graphical user interface for the automated test system in accordance with one embodiment of the present invention.

In one embodiment, the user enters in all the information regarding the requisite parameters for the various test classes, other general properties, and test class extension code into the pre-header editor using graphical user interface 805. The information regarding the parameters may comprise the names of the parameters, their allowed values, their types etc. As discussed above, the user may enter this information in through either the design view or the code view of the pre-header editor.

The editor automatically generates the textual pre-header file 810. As discussed above, when the user makes a change in the design view of the editor, the textual pre-header file is automatically updated with the changes if there are no errors.

The editor can also automatically generate the test class declaration C++ header file 815 from the pre-header file directly. The generated C++ header file is the one used to finally compile the test class C++ code 835. The C++ test class code 835 is compiled into binary DLL files that can be loaded for execution in the tester system software 820.

During validation phase, the tester system software 820 (also referred to as "tester operating system") reads in and analyzes the test plan OTPL code 850 developed by the test plan author for errors. The pre-header file 810 is used by tester operating system 820 to describe the test classes and the parameters needed by the test classes. By describing the test classes, the pre-header file allows the tester system software 820 to validate that the proper parameters are being passed to the various instances of the test classes.

The OTPL code 850 then gets loaded into the tester system software 820 along with the binary DLL test class files 875. In one embodiment, after OTPL code 850 is validated, the test plan code 850 then instantiates the test classes and uses the information from the pre-header file 810 to determine the appropriate parameters for the test class instantiation. The tester operating system 820 can populate the parameters for the various test classes based on the information provided in the pre-header file 810. For example, in FIG. 8, the tester operating system may read in a pattern list 890 and a pattern 895 that may be used as parameters for certain test classes instantiated within the OTPL code 850. In this way, the pre-header file enables the parameterization of the test classes. The test plan 825 is then executed by the tester system software 820.

Figure 9:
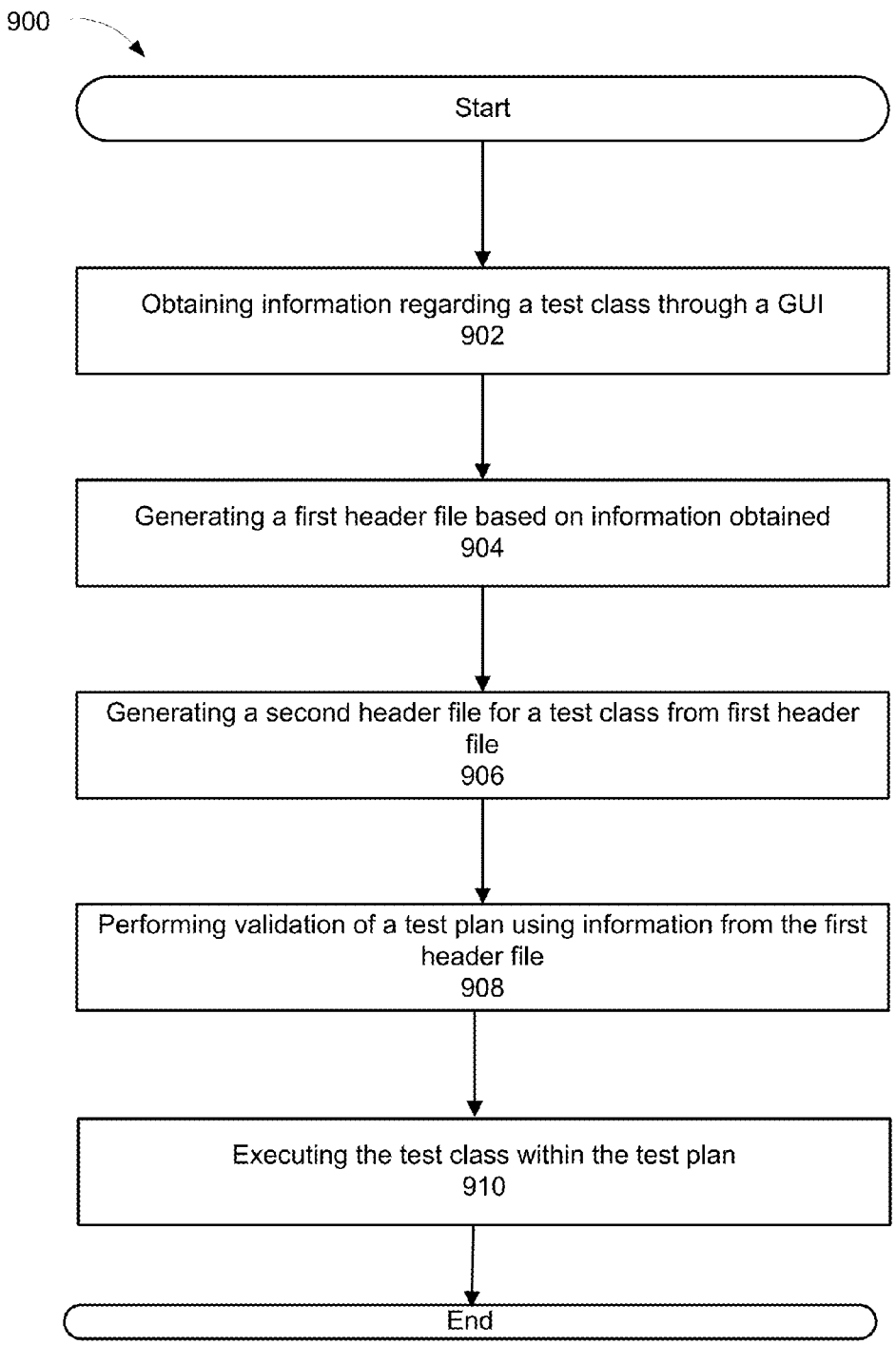
FIG. 9 depicts a flowchart of an exemplary computer controlled process of generating pre-header files using a graphical user interface, compiling test classes to generate executable DLLs and executing test plans using the pre-header files and the compiled test classes in accordance with one embodiment of the present invention.

FIG. 9 depicts a flowchart of an exemplary computer controlled process of generating pre-header files using a graphical user interface, compiling test classes to generate executable DLLs and executing test plans using the pre-header files and the compiled test classes in accordance with one embodiment of the present invention. The invention, however, is not limited to the description provided by flowchart 900. Rather, it will be apparent to persons skilled in the relevant art(s) from the teachings provided herein that other functional flows are within the scope and spirit of the present invention. Flowchart 900 will be described with continued reference to exemplary embodiments described above, though the method is not limited to those embodiments.

At step 902, the graphical user interface 805 of the design view of the pre-header editor obtains information from the test class author regarding test class parameters, other general information about the test class, e.g., test class name, base test class names, etc., and any test class extension code.

At step 904, the editor directly generates the pre-header text file 810 from the display view of the graphical editor based on the information inputted by the user.

At step 906, the editor can also directly and automatically generate the test class declaration C++ header file 815 from the pre-header file 810.

At step 908, a validation is performed by the tester operating system 820 using the parametric and other information from the pre-header file. The validated test plan along with the compiled DLL files 875 corresponding to the various test classes 835 are loaded into the tester system software 820.

It should be noted that a test plan may be developed separately and independently from the test class typically. More specifically, the pre-header is a test class artifact. Test plans that use the test class and its pre-header may be developed at a later stage. Accordingly, the validation stage at step 908 can be performed at a later and separate stage from the pre-header file generation.

At step 910, the test plan is executed by the tester system software 820 using the compiled DLL files 875. Before execution, however, the test classes in the test plan are instantiated and populated with parameters specified in the pre-header file. Accordingly, all the test class instances are also executed as part of the test flows within the test plan using the unique set of parameters that each one is instantiated with.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for performing tests using automated test equipment (ATE), said method comprising:
    obtaining information concerning at least one test class using a graphical user interface;
    generating a first header file automatically, wherein contents of said first header file comprise said information;
    importing said first header file into a test plan operable to execute using a tester operating system, wherein said tester operating system is installed on a system controller, wherein said test plan comprises instances of said at least one test class, and wherein said test plan is operable to define tests to be run on a plurality of devices under test (DUTs) communicatively coupled to said system controller;
    generating a second header file from said first header file automatically, wherein said second header file is a header file for said at least one test class, and wherein said second header file and said at least one test class are prepared using a common programming language;
    validating said test plan using said tester operating system; and
    loading said test plan and at least one compiled module onto said tester operating system for execution, wherein each of said at least one compiled module is a compiled translation of a respective one of said at least one test class, and wherein said second header file is used to generate said at least one compiled module.

2. The method of claim 1, further comprising:
   instantiating said at least one test class with said information from said first header file; and
   executing said test plan.
3. The method of claim 1 wherein said information comprises test class parameter definitions.
4. The method of claim 1 wherein said information comprises definitions for identifying said at least one test class.
5. The method of claim 1 wherein said information comprises extension code for said at least one test class.
6. The method of claim 1 wherein said graphical user interface comprises a first window and a second window, wherein said first window is operable to display information for a plurality of test class parameters, and wherein said second window is operable to display information corresponding to a test class parameter selected in said first window.
7. The method of claim 6 wherein said plurality of test class parameters are initialized with a default value, and further wherein values for said plurality of test class parameters are operable to be edited by a user.
8. The method of claim 1 further comprising automatically checking for syntax and semantic errors responsive to a user inputting and saving said information into a graphical editor of said graphical user interface.
9. The method of claim 1 wherein said graphical user interface comprises:
   a text editor mode; and
   a display editor mode.
10. The method of claim 9, further comprising automatically synchronizing changes made in said display editor mode with said text editor mode, and further comprising automatically synchronizing changes made in said text editor mode with said display editor mode.
11. A computer-readable storage medium having stored thereon, computer executable instructions that, if executed by a computer system cause the computer system to perform a method for performing tests using automated test equipment (ATE), said method comprising:
   obtaining information concerning at least one test class using a graphical user interface;
   generating a first header file automatically, wherein contents of said first header file comprise said information;
   importing said first header file into a test plan operable to execute using a tester operating system, wherein said tester operating system is installed on a system controller, wherein said test plan comprises instances of said at least one test class, and wherein said test plan is operable to define tests to be run on a plurality of devices under test (DUTs) communicatively coupled to said system controller;
   generating a second header file from said first header file automatically, wherein said second header file is a header file for said at least one test class, and wherein said second header file and said at least one test class are prepared using a common programming language;
   validating said test plan using said tester operating system; and
   loading said test plan and at least one compiled module onto said tester operating system for execution, wherein each of said at least one compiled module is a compiled translation of a respective one of said at least one test class, and wherein said second header file is used to generate said at least one compiled module.
12. The computer-readable medium as described in claim 11, wherein said method further comprises:
   instantiating said at least one test class with said information is selected from said first header file; and
   executing said test plan.
13. The computer-readable medium as described in claim 11, wherein said information is selected from the group consisting of: test class parameter definitions, definitions for identifying said at least one test class, extension code for said at least one test class.
14. The computer-readable medium as described in claim 11, wherein said graphical user interface comprises:
   a text editor mode; and
   a display editor mode.
15. The computer-readable medium as described in claim 14, wherein said method further comprises:
   automatically synchronizing changes made in said display editor mode with said text editor mode; and
   automatically synchronizing changes made in said text editor mode with said display editor mode.
16. The computer-readable medium as described in claim 11, further comprising automatically checking for syntax and semantic errors responsive to a user inputting and saving said information into a graphical editor of said graphical user interface.
17. The computer-readable medium as described in claim 11, wherein said graphical user interface comprises a first window and a second window, wherein said first window is operable to display information for a plurality of test class parameters, and wherein said second window is operable to display information corresponding to a test class parameter selected in said first window.
18. A system for performing an automated test, said system comprising:
   a memory comprising a tester operating system stored therein;
   a communicative interface operable to connect to a plurality of devices under test (DUTs);
   a processor coupled to the memory and the communicative interface, the processor being configured to operate in accordance with the tester operating system to:
      obtain information concerning at least one test class using a graphical user interface;
      generate a first header file automatically, wherein contents of said first header file comprise said information;
      import said first header file into a test plan operable to execute using said tester operating system, wherein said test plan comprises instances of said at least one test class, and wherein said test plan is operable to define tests to be run on said plurality of DUTs;
      generate a second header file from said first header file automatically, wherein said second header file is a header file for said at least one test class;
      validate said test plan using said tester operating system; and
      load said test plan and at least one compiled module onto said tester operating system for execution, wherein each of said at least one compiled module is a compiled translation of a respective one of said at least one test class, and wherein said second header file is used to generate said at least one compiled module.
19. A method for generating a header file for use in automated test equipment (ATE), said method comprising:
   obtaining information concerning at least one test class using a graphical user interface; and
   generating a first header file automatically, wherein contents of said first header file comprise said information;

importing said first header file into a test plan operable to execute using a tester operating system, wherein said tester operating system is installed on a system controller, wherein said test plan comprises instances of said at least one test class, and wherein said test plan is operable to define tests to be run on a plurality of devices under test (DUTs) communicatively coupled to said system controller;

generating a second header file from said first header file automatically, wherein said second header file is a header file for said at least one test class, and wherein said second header file and said at least one test class are prepared using a common programming language;

wherein the graphical user interface comprises a display editor window and a text editor window, and further wherein changes made in said display editor window are automatically mapped to corresponding changes in said text editor window, and further wherein changes made in said text editor window are automatically mapped to corresponding changes in said display editor window.

* * * * *